(12) United States Patent
Shrinkle

(10) Patent No.: US 9,315,113 B2
(45) Date of Patent: Apr. 19, 2016

(54) ELECTRIC VEHICLE BATTERY SYSTEMS WITH EXCHANGEABLE PARALLEL ELECTRIC VEHICLE BATTERY MODULES

(71) Applicant: Ample, Inc., San Francisco, CA (US)

(72) Inventor: Louis J. Shrinkle, Leucadia, CA (US)

(73) Assignee: Ample Inc., San Francisco, CA (US)

( * ) Notice: Subject to any disclaimer, the term of this patent is extended or adjusted under 35 U.S.C. 154(b) by 178 days.

(21) Appl. No.: 14/138,683

(22) Filed: Dec. 23, 2013

(65) Prior Publication Data

US 2014/0176073 A1 Jun. 26, 2014

Related U.S. Application Data

(60) Provisional application No. 61/813,765, filed on Apr. 19, 2013, provisional application No. 61/740,776, filed on Dec. 21, 2012.

(51) Int. Cl.
| | | |
|---|---|---|
| H02J 7/00 | (2006.01) | |
| B60L 11/18 | (2006.01) | |
| H02J 7/14 | (2006.01) | |
| B60L 3/00 | (2006.01) | |

(52) U.S. Cl.
CPC .......... *B60L 11/1866* (2013.01); *B60L 3/0046* (2013.01); *B60L 11/1822* (2013.01); *B60L 11/1872* (2013.01); *H02J 7/0016* (2013.01); *H02J 7/0024* (2013.01); *H02J 7/1423* (2013.01); *B60L 2240/545* (2013.01); *B60L 2240/547* (2013.01); *B60L 2240/549* (2013.01); *Y02T 10/7005* (2013.01); *Y02T 10/7061* (2013.01); *Y02T 10/7072* (2013.01); *Y02T 90/124* (2013.01); *Y02T 90/14* (2013.01); *Y02T 90/16* (2013.01)

(58) Field of Classification Search
CPC ..... H02J 7/1423; H02J 7/0024; H02J 7/0016; Y02E 60/12
USPC .................................................. 320/117, 126
See application file for complete search history.

(56) References Cited

U.S. PATENT DOCUMENTS

| | | | |
|---|---|---|---|
| 6,331,365 B1 | 12/2001 | King | |
| 6,631,775 B1 * | 10/2003 | Chaney | ........................ 180/68.5 |
| 6,700,351 B2 * | 3/2004 | Blair | ..................... H02J 7/0022 |
| | | | 320/125 |
| 7,535,199 B2 * | 5/2009 | Kimura | ................. H02J 7/0026 |
| | | | 320/116 |
| 7,598,706 B2 | 10/2009 | Koski et al. | |
| 8,004,238 B2 | 8/2011 | Kim et al. | |
| 8,120,322 B2 * | 2/2012 | Lee | ...................... H02J 7/0016 |
| | | | 320/118 |
| 8,143,851 B2 | 3/2012 | Greening et al. | |
| 8,146,694 B2 | 4/2012 | Hamidi | |

(Continued)

*Primary Examiner* — M'Baye Diao
(74) *Attorney, Agent, or Firm* — Intrinsic Law Corp.; Ibrahim M. Hallaj

(57) ABSTRACT

Systems and methods for electric vehicle battery systems with replaceable parallel electric vehicle battery modules are described herein. The electric vehicle battery system includes a plurality of electric vehicle battery modules connected in parallel. Each electric vehicle battery module includes a battery. Each electric vehicle battery module can also include a balancing circuit in electrical communication with a current path from the battery to an electric vehicle battery module output node. Each electric vehicle battery module also may have a current sensor in electromagnetic communication with the current path between the battery and the balancing circuit. The current sensor can be configured to sense a current level between the battery and the balancing circuit. The balancing circuit can be configured to balance the current level sensed by the current sensor of each electric vehicle battery module.

26 Claims, 7 Drawing Sheets

(56) References Cited

U.S. PATENT DOCUMENTS

| | | | |
|---|---|---|---|
| 8,212,571 B2 | 7/2012 | Emori et al. | |
| 8,294,295 B2 | 10/2012 | Xiao | |
| 8,330,417 B2 | 12/2012 | Athas et al. | |
| 8,384,350 B2 | 2/2013 | Shin et al. | |
| 8,994,300 B2* | 3/2015 | Ohkura | B60L 3/0007 318/139 |
| 2011/0080139 A1 | 4/2011 | Troxel et al. | |
| 2011/0270480 A1* | 11/2011 | Ishibashi et al. | 701/22 |
| 2012/0034481 A1 | 2/2012 | Higa et al. | |
| 2012/0161708 A1* | 6/2012 | Miura et al. | 320/118 |
| 2012/0262121 A1* | 10/2012 | Kuo et al. | 320/126 |
| 2012/0293130 A1 | 11/2012 | Burstein et al. | |
| 2013/0062939 A1 | 3/2013 | Engler et al. | |
| 2013/0134943 A1 | 5/2013 | Maloizel et al. | |
| 2013/0154567 A1 | 6/2013 | Peterson et al. | |
| 2013/0181513 A1* | 7/2013 | Yano | B60L 11/1816 307/10.1 |
| 2013/0328529 A1* | 12/2013 | Zbrozek | 320/118 |
| 2014/0015488 A1* | 1/2014 | Despesse | H01M 10/425 320/122 |
| 2014/0175873 A1* | 6/2014 | Kishimoto et al. | 307/10.1 |

* cited by examiner

ELECTRIC VEHICLE BATTERY SYSTEMS WITH EXCHANGEABLE PARALLEL ELECTRIC VEHICLE BATTERY MODULES

CROSS-REFERENCE TO RELATED U.S. APPLICATIONS

This application claims priority to U.S. Provisional Application No. 61/740,776, filed on Dec. 21, 2012 and U.S. Provisional Application No. 61/813,765, filed on Apr. 19, 2013, each disclosure of which is hereby incorporated by reference in its entirety.

FIELD

The present disclosure relates generally to electric vehicle battery systems and in particular to electric vehicle battery systems with replaceable parallel electric vehicle battery modules.

BACKGROUND

Vehicles, such as but not limited to cars, trains, aircraft, and ships, are converting from combustible energy sources such as gasoline to using electric motors powered by batteries. For example, hybrid electric vehicles are now widely available that can use energy derived from a battery as well as another source, such as an internal combustion engine. In addition, full electrically-powered vehicles that use energy derived solely from a battery are also available to consumers.

Many of these electric vehicles suffer from differing problems that prevent them from being widely adopted. For example, some electric vehicles have very limited range, which makes the cars less desirable to consumers. One method of increasing range has been a program wherein electric vehicles are designed to have their battery packs rapidly changed out, such as at a service station, much in the way that current consumers fill a tank with gasoline.

In addition, replacement or repair of large lithium ion battery backs, such as those disposed within electric vehicles, can be quite expensive and even dangerous. The voltages generated by these battery packs are quite high and not user serviceable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an electric vehicle battery system. The electric vehicle battery system includes a plurality of electric vehicle battery modules connected in parallel. Each electric vehicle battery module includes a battery. In certain non-limiting embodiments, the battery can be implemented as a combination of individual cells arranged in series, parallel or a combination of series and parallel. Each electric vehicle battery module also includes a balancing circuit in electrical communication with a current path from the battery to an electric vehicle battery module output node. Each electric vehicle battery module also includes a current sensor in electromagnetic communication with the current path between the battery and the balancing circuit. The current sensor can be configured to sense a current level between the battery and the balancing circuit. The balancing circuit can be configured to balance the current level sensed by the current sensor of each electric vehicle battery module.

Another aspect of the subject matter described in the disclosure provides a method of operating an electric vehicle battery system. The method includes monitoring a first current level using a first current sensor at a first current path between a first battery and an electric vehicle battery module output node. The method also includes balancing the first current level at the first current path using a first balancing circuit in electrical communication with the first current path based upon the first current level. The first current sensor, first battery and first balancing circuit can be part of a first electric vehicle battery module. The method also includes monitoring a second current level using a second current sensor at a second current path between a second battery and the electric vehicle battery module output node. The method also includes balancing the second current level at the second current path using a second balancing circuit in electrical communication with the second current path based upon the second current level. The second current sensor, second battery and second balancing circuit can be part of a second electric vehicle battery module. Also, the first electric vehicle battery module and second electric battery module can be connected in parallel with each other at the electric vehicle battery module output node.

Figure 1:
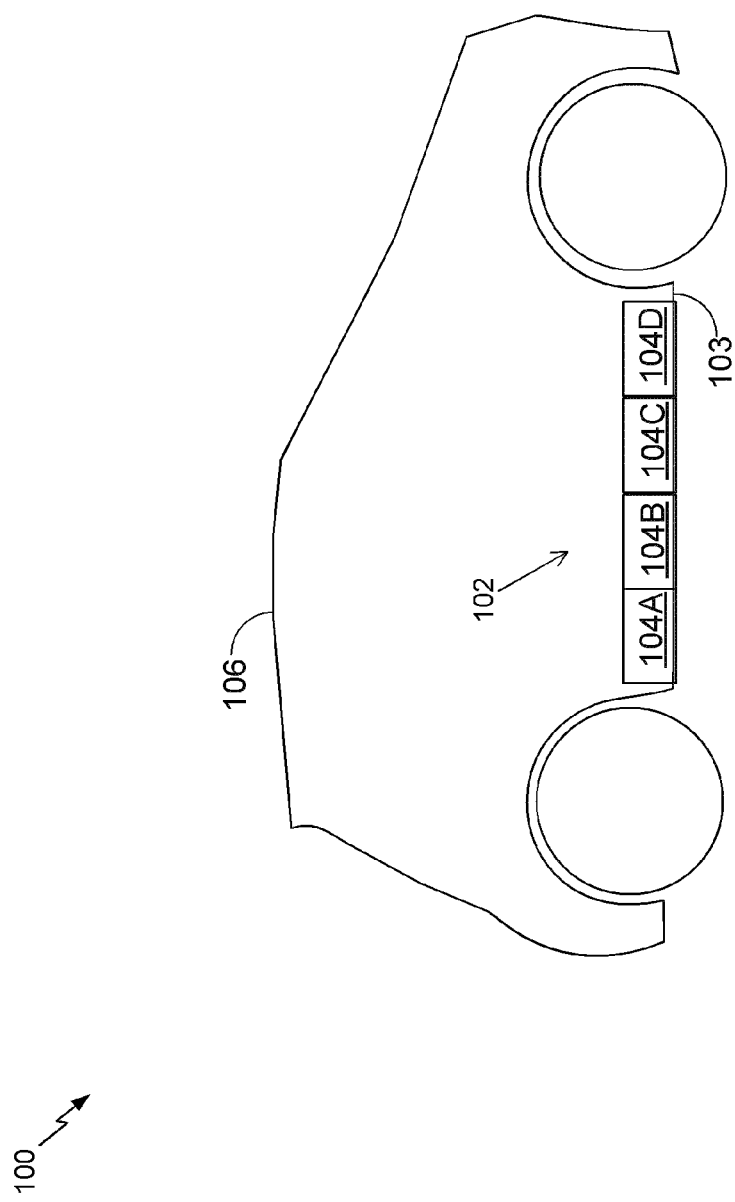
FIG. 1 is a diagram illustrating an electric vehicle battery system of an electric vehicle in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments which may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Embodiments relate to systems and methods of charging an electric vehicle battery system. In one embodiment, the electric vehicle battery system includes a plurality of self-contained electric vehicle battery modules that are electrically connected in parallel to one another. Users can remove one or more electric vehicle battery modules from the electric vehicle battery system and replace it with fresh electric vehicle battery modules at their convenience. In one embodiment, each electric vehicle battery module includes its own balancing circuit. This allows the electric vehicle battery system to tolerate newly introduced electric vehicle battery modules that are fully charged, partially charged, or not charged at all, without risking damage to the electric vehicle battery modules.

In these embodiments, each electric vehicle battery module is essentially self-contained and configured to be removably mounted within an electric vehicle battery system without damaging the electric vehicle battery module being changed, or the remaining each electric vehicle battery module within the electric vehicle battery system. As can be envisioned, within an electric vehicle, each electric vehicle battery module may have a large voltage. For example, some electric vehicle battery module may have 200, 300, 400, 500 or more volts per electric vehicle battery module.

FIG. 1 is a diagram illustrating an electric vehicle system 100 that includes an electric vehicle 106 in accordance with an exemplary embodiment. The electric vehicle system 100 has an electric vehicle battery system 102 that can be integrated with the electric vehicle 106 in any manner, including by being internal to the electric vehicle or external to the electric vehicle in order for the electric vehicle to receive energy from the electric vehicle battery system 102. In the illustrated embodiment, the electric vehicle battery system 102 is integrated within the electric vehicle 106 toward a lower surface 103 of the electric vehicle 106. Also, the electric vehicle battery system 102 can include multiple electric vehicle battery modules 104A-D connected in parallel. Each of these electric vehicle battery modules can be used as part of the electric vehicle battery system 102 to provide energy to the electric vehicle 106.

Figure 2:
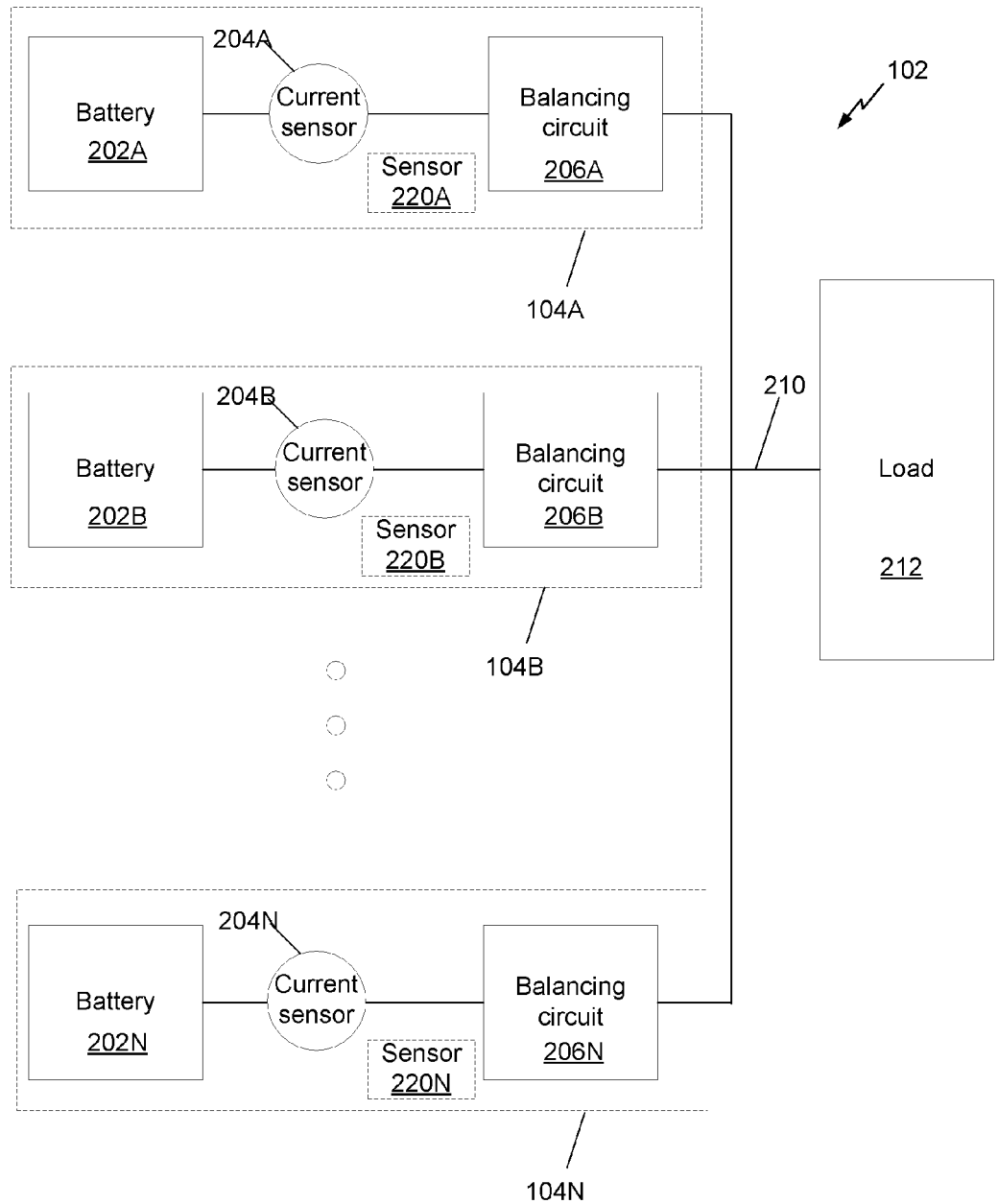
FIG. 2 is a diagram illustrating various components of the electric vehicle battery system of FIG. 1.

FIG. 2 is a diagram illustrating various components of the electric vehicle battery system 102 of FIG. 1. The electric vehicle battery system 102 includes multiple electric vehicle battery modules 104A-N connected in parallel. Each of the electric vehicle battery modules 104A-N can be connected in parallel with each other and to a load 212 at an output node 210.

The load 212 can be any and/or all aspects of the electric vehicle 106 that takes energy from the electric vehicle battery system 102, such as but not limited to an electric vehicle's locomotion system. Although the illustrated embodiment in FIG. 2 presents the load 212 as an example of an electric vehicle battery system 102 during discharge of the battery 202A-N, various embodiments discussed below also present the electric vehicle battery system 102 during charge of the battery 202A-N. Each electric vehicle battery module 104A-N can include a battery 202A-N, current sensor 204A-N and balancing circuit 206A-N. The balancing circuit 206A-N is configured to monitor the current level within the associated electric vehicle battery module 104A-N and maintain a specific current balance relative to other electric vehicle battery modules 104A-N within the electric vehicle battery system 102. The current level within the electric vehicle battery module can be determined using the current sensor 204A-N.

The balancing circuit 206A-N can balance the current level within the electric vehicle battery module 104A-N by controlling the connection between the battery 202A-N and an output node 210. The connection can be controlled through pulse width modulation that controls connection and disconnection of the battery 202 with the output node 210, discussed in further detail below. In certain embodiments, the balancing circuit 206A-N can control the connection between the battery 202A-N of the electric vehicle battery module 104A-N and the output node 210 by controlling the connection between the electric vehicle battery module 104A-N and the output node 210.

In a number of embodiments, each of the electric vehicle battery modules 104A-N are configured to be removed and reconnected with the electric vehicle battery system 102A-N. This can be accomplished by connecting each of the electric vehicle battery modules 104A-N in parallel. This can also be accomplished by regulating the current within each of the electric vehicle battery modules 104A-N. Connecting each of the electric vehicle battery modules 104A-N in parallel allows the electric vehicle battery system 102 to operate in a modular fashion where energy stored within batteries of the electric vehicle battery system 102 can be regulated by adding charged batteries and/or removing spent batteries. Also, the balancing circuit 206A-N associated with each electric vehicle battery module 104A-N can regulate both the energy that is provided to the electric vehicle battery system 102 and the energy that is received from the electric vehicle battery system 102.

In certain embodiments, the balancing circuit 206A-N of each electric vehicle battery module is configured to control the current level within each respective electric vehicle battery module 104A-N. The balancing circuit 206A-N can control the current level in one embodiment by using a module switch that is configured to control the connection between the battery 202A-N and the output node 210 by reducing the current level within the electric vehicle battery module 104A-N. The module switch can reduce the current level by pulse width modulation adjustment of the connection between the battery 202A-N of the electric vehicle battery module 104A-N and the output node 210. The module switch can be implemented as one or more switches in accordance with different embodiments. Various implementations of the module switch will be discussed in further detail below.

In specific embodiments, the balancing circuit 206A-N can be configured to disconnect the battery 202A-N from the electric vehicle battery output node 210 upon detection of the occurrence of a disconnection condition. In one exemplary embodiment, the disconnection condition can be when the current level sensed by the current sensor 204 is beyond a predetermined threshold. In another exemplary embodiment, the disconnection condition can be when a voltage level of the electric vehicle battery module 104A-N is beyond an upper threshold or below a lower threshold. The voltage level can be of any battery cell or combination of cells within the battery 202A-N. In yet another exemplary embodiment, the disconnection condition can be when a temperature of the electric vehicle battery module 104A-N is beyond an upper threshold or below a lower threshold, as indicated by sensor 220A-N implemented as a temperature sensor. In a further exemplary embodiment, the disconnection condition can be when the electric vehicle battery module 104A-N is about to be removed from the electric vehicle battery system 102, as indicated by sensor 220A-N implemented as a disconnection sensor. In a yet further exemplary embodiment, the disconnection condition can be when the electric vehicle is shut off, as indicated by sensor 220A-N implemented as a sensor for when the electric vehicle is shut off.

In particular embodiments, the electric vehicle battery system 102 can be configured with electric vehicle battery modules 104 having specifications that can support the energy requirements of an electric vehicle 106. These specification can include (but are not limited to) batteries configured to hold at least 200 volts, pulse width modulation between 10 KHz to 500 KHz and where the current path is configured to conduct between 30 to 50 amperes of maximum current.

Figure 3:
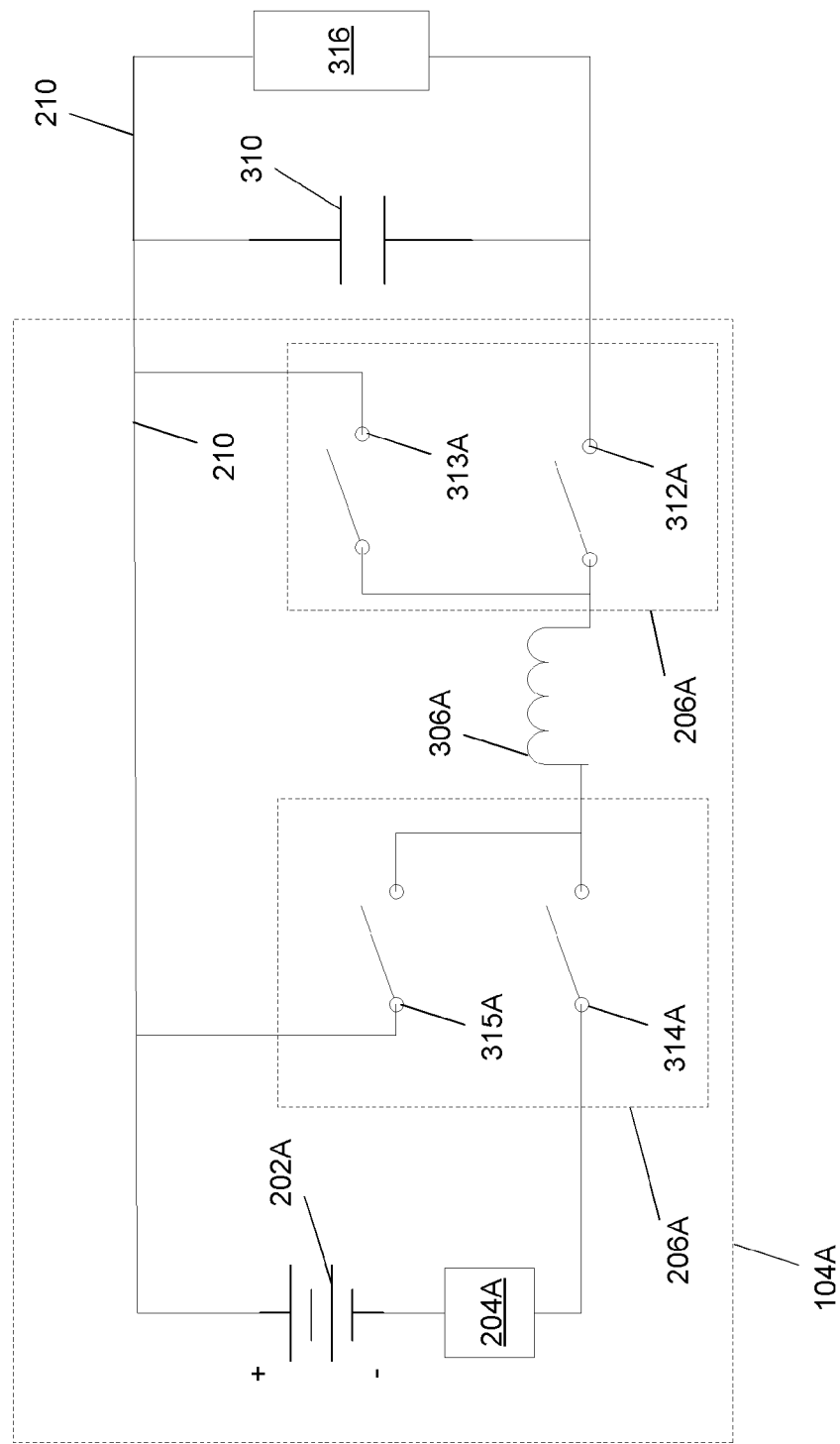
FIG. 3 is a diagram of an implementation of an electric vehicle battery module within the electric vehicle battery system of FIG. 2.

FIG. 3 is a diagram of an implementation of an electric vehicle battery module 104A within the electric vehicle battery system of FIG. 2. The diagram illustrates that the electric vehicle battery module 104A includes a battery 202A connected to an output node 210 via the balancing circuit 206A.

The balancing circuit 206A can include the module switch as a first set of complementary switches 312A, 313A and second set of complementary switches 314A and 315A. Each set of complementary switches operates in that when one switch of the set of complementary switches is open, the other is closed. For example, when switch 314A is open, switch 315A is closed and when switch 315A is open, switch 314A is closed. Similarly, when switch 312A is open, switch 313A is closed and when switch 313A is open, switch 312A is closed. As will be discussed in further detail below, balancing by pulse width modulation of the first set of complementary switches 312A, 313A occurs during charging of the battery 202A. Also, balancing by pulse width modulation of the second set of complementary switches 314A, 315A occurs during discharge of the battery 202A.

A common element 316 is used to represent either a common resistive element representing resistance across the load during discharge of the battery 202A or a common charging source representing a charging source during charging of the battery 202A. The common charging source can represent any charging source such as (but not limited to) the parallel connection of other electric vehicle battery modules 104A-N within the electric vehicle battery system or by an external charging source provided to the electric vehicle battery system 102. An inductor 306A and common capacitor 310 act as a smoothing circuit to smooth the electrical signal at the output node 210. The common element 316 and common capacitor 310 may not be unique to any particular electric vehicle battery module 320, but can be shared by each of the electric vehicle battery modules 104A-N connected in parallel as part of the electric vehicle battery system 102. A current sensor 204A can be used to sense the current within the electric vehicle battery module 104A. In certain embodiments, the current sensor 204A can be implemented as a sensor, such as but not limited to a hall effect sensor or a sense resistor where the voltage across the sense resistor (and/or current at the sense resistor) can be determined. In specific embodiments, the operation of the balancing circuit 206A can be dependent upon the current level sensed by the current sensor 204A.

In additional embodiments, the balancing circuit 206A can control the connection between the battery 202A and the output node 210 by balancing the current within the electric vehicle battery module 104A during charge or discharge of the battery 202A. In certain embodiments, the battery 202A can be discharged with pulse width modulation of the second complementary switches 314A, 315A while the switch 312A is closed and switch 313A is open. Similarly, the battery 202A can be charged with pulse width modulation of the first complementary switches 312A, 313A while the switch 314A is closed and 315A is open. As discussed above, each set of complementary switches operates in that when one switch of the set of complementary switches is open, the other is closed. The battery 202A can be charged by the parallel connection of other electric vehicle battery modules as represented by the element 316 operating as a charging source at the output node 210. Also, the battery 202A can be discharged as represented by the element 316 operating as a load. In each case of charge or discharge, pulse width modulation of the balancing circuit 206A can be performed based upon the current level sensed by the current sensor 204A. In certain embodiments, all switches 312A, 313A, 314A and 315A can be open when the battery 202A is disconnected to the output node 210.

Figure 4:
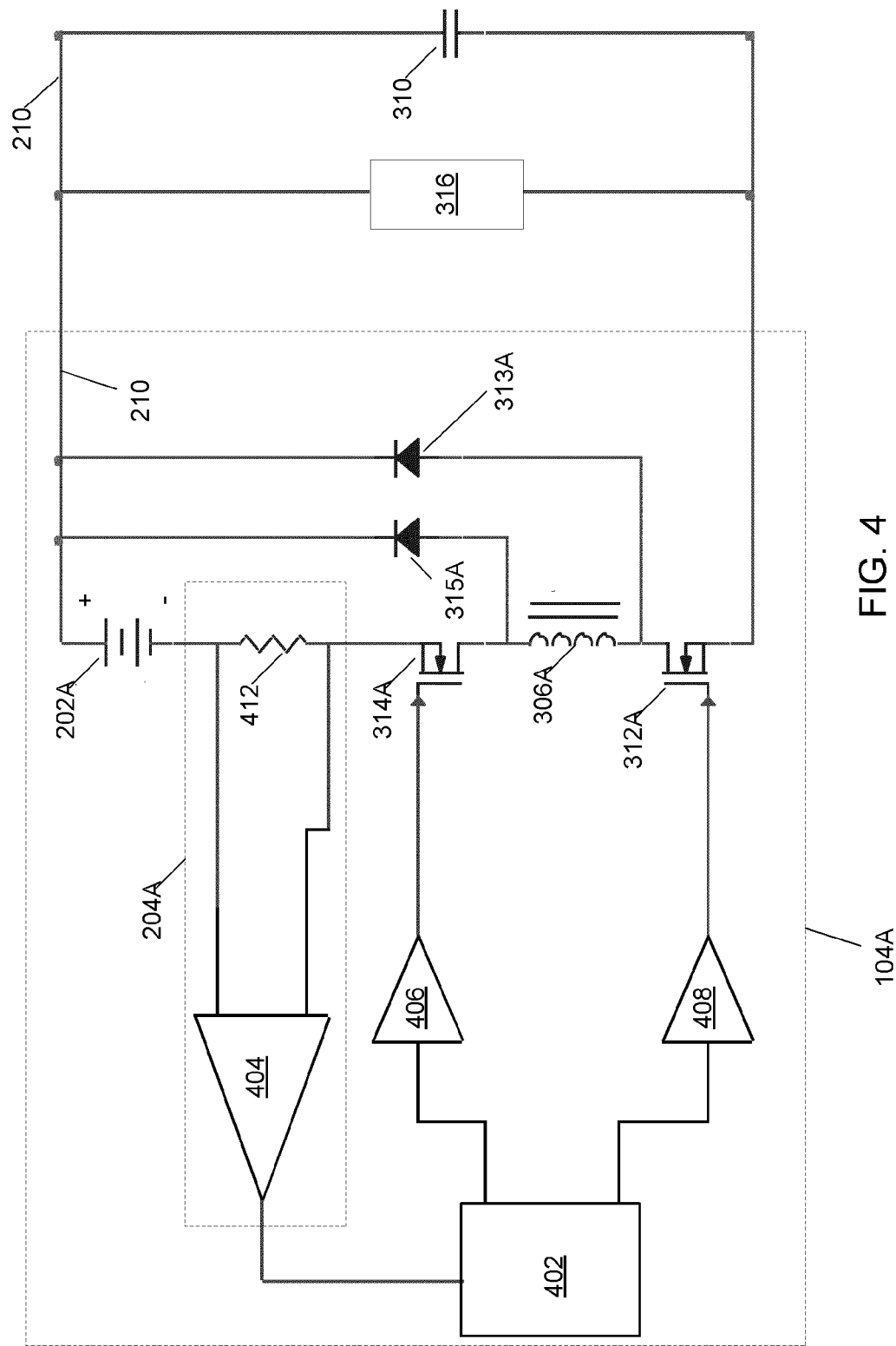
FIG. 4 is a circuit diagram of another version of the electric vehicle battery module of the electric vehicle battery system of FIG. 2.

FIG. 4 is a circuit diagram of an implementation of the electric vehicle battery module of the electric vehicle battery system of FIG. 2. The circuit diagram illustrates that the electric vehicle battery module 104A includes the battery 202A connected to the output node 210 via a balancing circuit. The balancing circuit can be implemented as a module switch with the second set of complementary switches 314A, 315A and the first set of complementary switches 312A, 313A driven by their respective drivers 406, 408 and controlled by a processor 402. The switches 314A and 312A, can be implemented as metal-oxide-semiconductor field-effect transistors (MOSFETs) directly driven by their respective drivers 406, 408. The switches 315A and 313A can be implemented as diodes that function as complementary switches to switches 314A and 312A as discussed above. Although certain switches are implemented as MOSFETS, any circuit that functions as a switch (such as but not limited to IGBTs) can be utilized in different embodiments. The processor 402 can control the operation of the switches 314A, 312A based upon the current sensor 204A. In certain embodiments, the processor 402 can control the operation of the switches 314A and 312A based upon an input other than the current sensor, such as but not limited to whether a disconnection condition has occurred. The current sensor 204A can be implemented as a sense resistor 412 where the voltage across the sense resistor 412 (and/or current at the sense resistor) can be determined using a comparator 404. The inductor 306A and common capacitor 210 can be implemented as a smoothing circuit to smooth the signals within the electric vehicle battery module 104A. The common element 316 is used to represent either a common resistive element representing resistance across the load during discharge of the battery 202A or a common charging source representing a charging source during charging of the battery 202A. The common element 316 and common capacitor 310 may not be unique to any particular electric vehicle battery module 104A but can be shared by each of the electric vehicle battery modules 104A connected in parallel as part of the electric vehicle battery system 400.

In additional embodiments, the balancing circuit can control the connection between the battery 202A and the output node 210 by balancing the current within the electric vehicle battery module 104A during charge or discharge of the battery 202A. In certain embodiments, the current within the electric vehicle battery module 104A can be balanced while the battery 202A is discharging by pulse width modulation of the second set of complementary switches 314A, 315A while the switch 312A is closed (with diode 313A functioning as an open switch). Also, the current within the electric vehicle battery module 104A can be balanced while the battery 202A is charging by pulse width modulating the first set of complementary switches 312A, 313A while the switch 314A is closed (with diode 315A functioning as an open switch). The battery 202A can be charged by the parallel connection of other electric vehicle battery modules while the element 316 operates as a charging source at the output node 210. Also, the battery 202A can be discharged while the element 316 operates as a load. In each case of charge or discharge, pulse width modulation can be performed based upon the current level sensed by the current sensor 204A. In certain embodiments, all switches 312A, 313A, 314A and 315A can be open when the battery 202A is disconnected to the output node 210.

Figure 5:
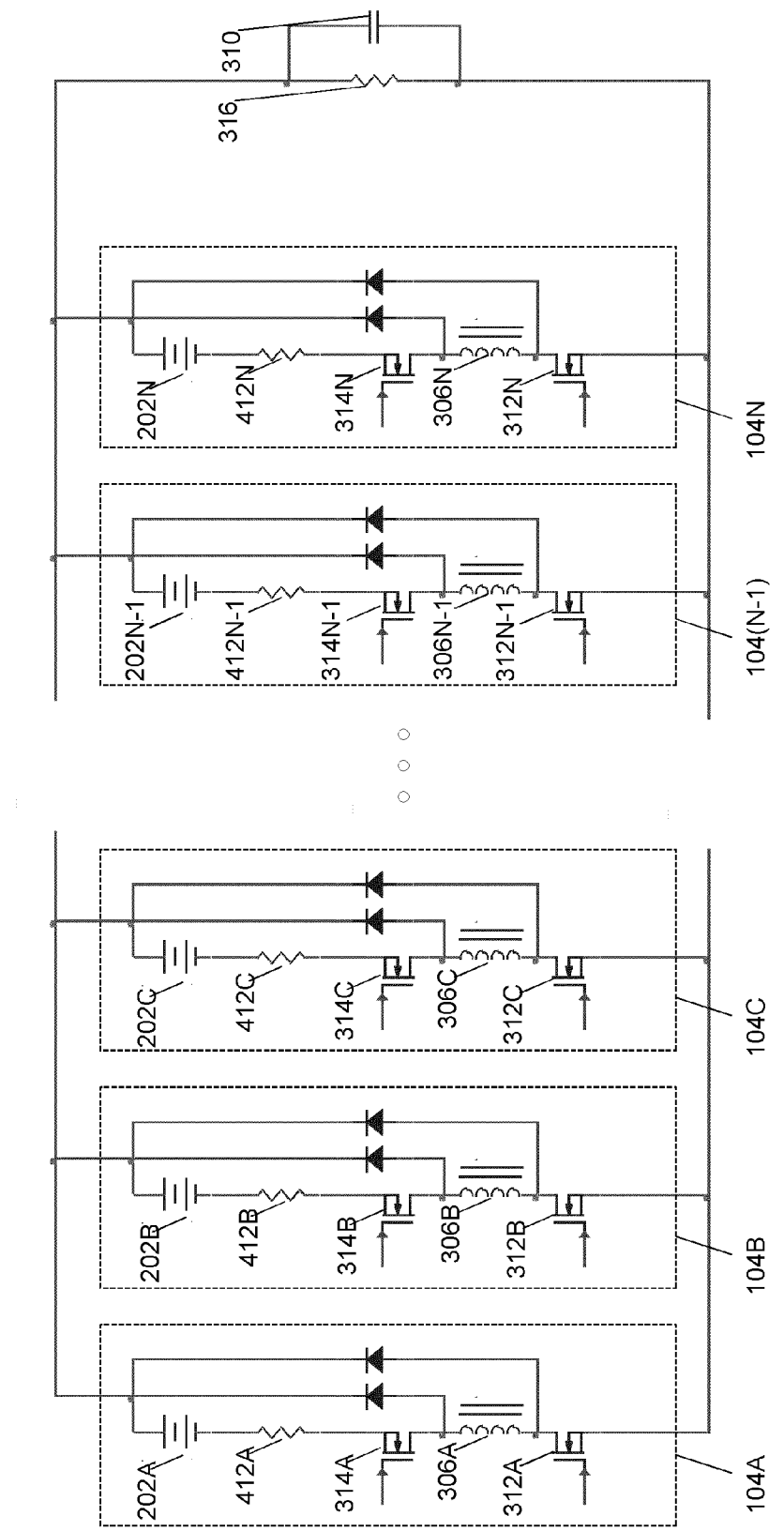
FIG. 5 is a circuit diagram of the electric vehicle battery system of FIG. 2 using the electric vehicle battery module implementation of FIG. 4.

FIG. 5 is a circuit diagram of the electric vehicle battery system of FIG. 2 using the electric vehicle battery module implementation of FIG. 4. Each electric vehicle battery module can be implemented with the circuit elements of the electric vehicle battery module 104A-N of FIG. 4. However, only the battery 202A-N, sense resistor 412A-N, switches 314A-N, 312A-N, inductor 306A-N, common capacitor 310 and common element 316 of each is illustrated for the sake of simplicity. The illustrated embodiment demonstrates that any number of electric vehicle battery modules can be connected in parallel to form an electric vehicle battery system.

Figure 6:
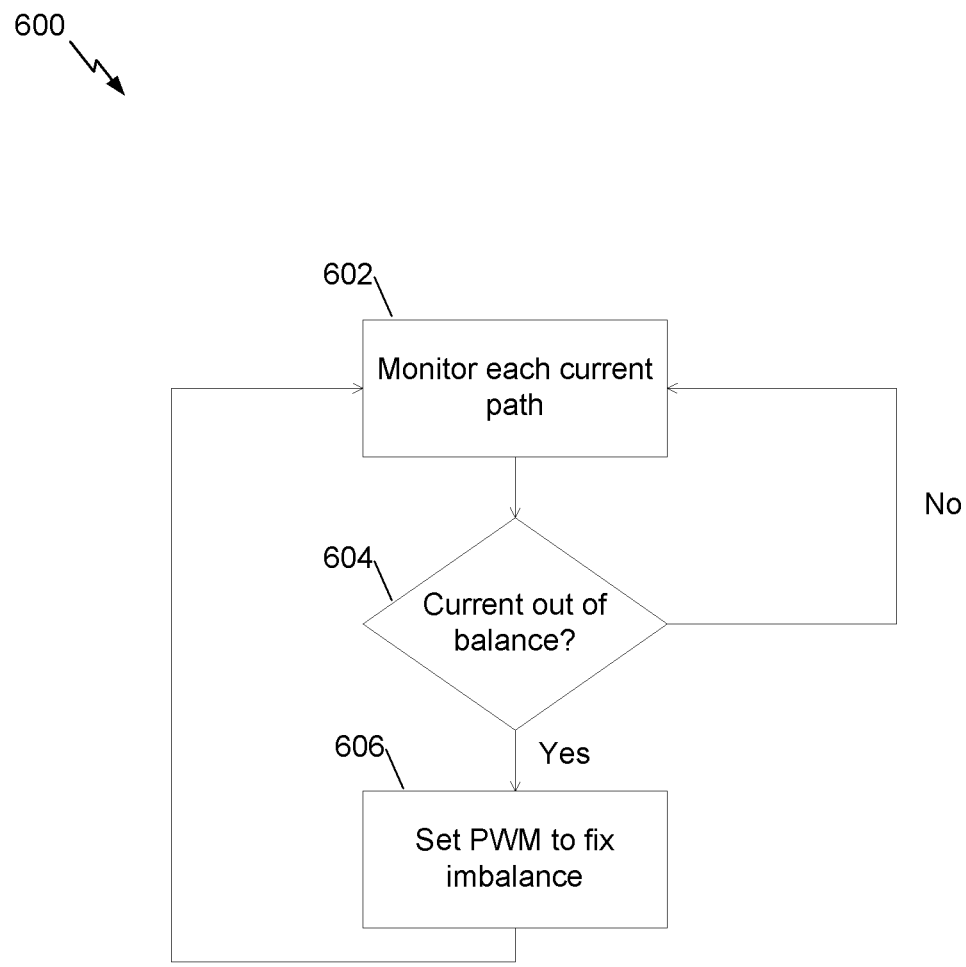
FIG. 6 is a flow chart illustrating operation of each of the balancing circuits of an electric vehicle battery system of FIG. 2.

FIG. 6 is a flow chart illustrating operation of each of the balancing circuits of an electric vehicle battery system of FIG. 2. Although the process 600 is illustrated in a particular order, in certain embodiments certain blocks herein may be performed in a different order, simultaneously or omitted and different blocks can be added. A person of ordinary skill in the art will appreciate that the process of the illustrated embodiment may be implemented in any balancing circuit of the electric vehicle battery system that can be configured to balance the current level within the electric vehicle battery module.

At block 602, each of the balancing circuits of the electric vehicle battery system can monitor the current within each respective electric vehicle battery module. At block 604 a decision can be made as to whether the current sensed by the current sensor of the respective electric vehicle battery module is out of balance relative to the electric vehicle battery system. If the current is out of balance, then the process proceeds to block 606. At block 606, pulse width modulation (PWM) of the balancing circuit of the electric vehicle battery module that is out of balance is set in a manner that fixes the imbalance (such as but not limited to by increasing or decreasing the duty cycle of operation of the switches of the balancing circuit). If the current is in balance, then the process proceeds to block 602.

Figure 7:
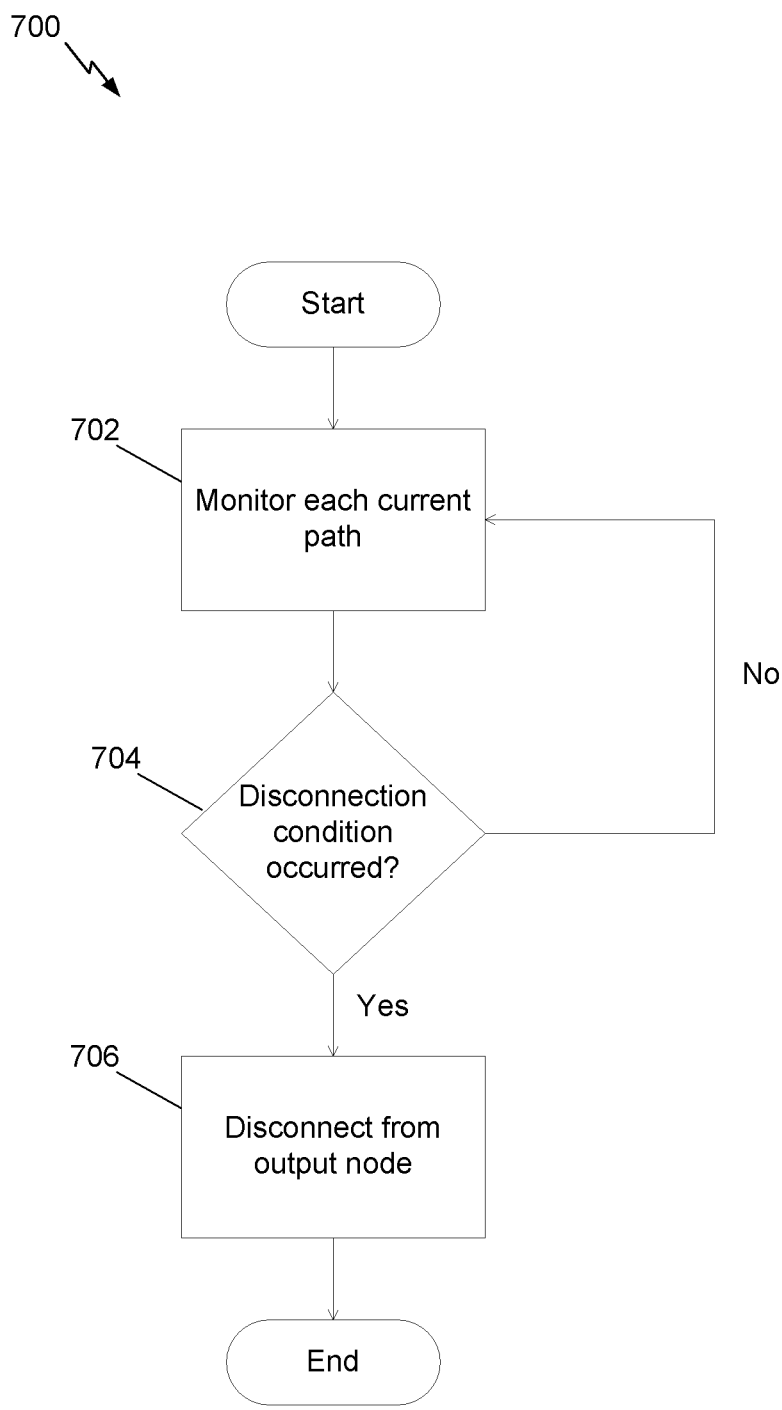
FIG. 7 is a flow chart illustrating operation of each of the balancing circuits of an electric vehicle battery system of FIG. 2 upon occurrence of a disconnection condition.

FIG. 7 is a flow chart illustrating operation of each of the balancing circuits of an electric vehicle battery system of FIG. 2 upon occurrence of a disconnection condition. Although the process 700 is illustrated in a particular order, in certain embodiments certain blocks herein may be performed in a different order, simultaneously or omitted and different blocks can be added. A person of ordinary skill in the art will appreciate that the process of the illustrated embodiment may be implemented in any balancing circuit of the electric vehicle battery system that can be configured to balance the current level within the electric vehicle battery module upon occurrence of the disconnection condition.

At block 702, each of the balancing circuits of the electric vehicle battery system can monitor the current within each respective electric vehicle battery module. At block 704 a decision can be made as to whether a disconnection condition has occurred. If the disconnection condition has occurred at block 704, then the process proceeds to block 706. At block 706, the battery of the respective electric battery module is disconnected from the output node of the electric vehicle battery system. If the disconnection condition has not occurred at block 704, then the process proceeds to block 702.

A disconnection condition can be any condition as recognized by the balancing circuit for disconnection of the battery from the output node. For example, as discussed above, in one exemplary embodiment, the disconnection condition can be when the current level sensed by the current sensor is beyond a threshold. In another exemplary embodiment, the disconnection condition can be when a voltage level of the electric vehicle battery module is beyond an upper threshold or below a lower threshold. The voltage level can be of any battery cell or combination of cells within the battery. In yet another exemplary embodiment, the disconnection condition can be when a temperature of the electric vehicle battery module is beyond an upper threshold or below a lower threshold. In a further exemplary embodiment, the disconnection condition can be when the electric vehicle battery module is about to be removed from the electric vehicle battery system. In a yet further exemplary embodiment, the disconnection condition can be when the electric vehicle is shut off.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of certain embodiments have been described herein. It is to be understood that not necessarily all such advantages may be achieved in accordance with any particular embodiment. Thus, the embodiments may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An electric vehicle battery system, comprising:
   a plurality of electric vehicle battery modules connected in parallel, each electric vehicle battery module comprising:
      a battery;
      a balancing circuit in electrical communication with a current path from the battery to an electric vehicle battery module output node; and
      a current sensor in electromagnetic communication with the current path between the battery and the balancing circuit, the current sensor configured to sense a current level between the battery and the balancing circuit,
      wherein the balancing circuit is configured to balance the current level sensed by the current sensor of each electric vehicle battery module, and
      wherein the balancing circuit is configured to disconnect the battery from the electric vehicle battery module output node when the electric vehicle battery module is about to be removed from the electric vehicle battery system.

2. The electric vehicle battery system of claim 1, wherein the electric vehicle module output node is connected to a load.

3. The electric vehicle battery system of claim 1, wherein the electric vehicle battery module output node is connected to a charging source.

4. The electric vehicle battery system of claim 1, wherein the balancing circuit comprises a module switch, the balancing circuit configured to control pulse width modulation of the module switch to control the current level.

5. The electric vehicle battery system of claim 4, wherein the pulse width modulation of the module switch comprises disconnecting the battery from the output node when the current level is beyond an upper threshold and connecting the battery to the output node when the current level is below a lower threshold.

6. The electric vehicle battery system of claim 5, wherein the pulse width modulation is between 10 KHz to 500 KHz.

7. The electric vehicle battery system of claim 4, wherein the balancing circuit is configured to balance the current level by reducing the current level.

8. The electric vehicle battery system of claim 1, wherein each of the electric vehicle battery modules are configured to be removed and reconnected with the electric vehicle battery system without damage.

9. The electric vehicle battery system of claim 1, wherein each battery is configured to hold at least 120 volts.

10. The electric vehicle battery system of claim 1, wherein the balancing circuit is configured to disconnect the battery from the electric vehicle battery module output node when the current level sensed by the current sensor is beyond a threshold.

11. The electric vehicle battery system of claim 1, wherein the balancing circuit is configured to disconnect the battery from the electric vehicle battery module output node when a voltage level of the electric vehicle battery module is not between an upper threshold and a lower threshold.

12. The electric vehicle battery system of claim 1, wherein the balancing circuit is configured to disconnect the battery from the electric vehicle battery module output node when a temperature of the electric vehicle battery module is not between an upper threshold and a lower threshold.

13. The electric vehicle battery system of claim 1, wherein the balancing circuit is configured to disconnect the battery from the electric vehicle battery module output node when the electric vehicle is shut off.

14. A method of operating an electric vehicle battery system, comprising:
   monitoring a first current level using a first current sensor at a first current path between a first battery and an electric vehicle battery module output node;
   balancing the first current level at the first current path using a first balancing circuit in electrical communication with the first current path based upon the first current level, where the first current sensor, first battery and first balancing circuit comprises a first electric vehicle battery module;
   monitoring a second current level using a second current sensor at a second current path between a second battery and the electric vehicle battery module output node; and
   balancing the second current level at the second current path using a second balancing circuit in electrical communication with the second current path based upon the second current level, where the second current sensor, second battery and second balancing circuit comprises a second electric vehicle battery module,
   wherein the first electric vehicle battery module and the second electric vehicle battery module are connected in parallel with each other at the electric vehicle battery module output node,
   wherein balancing the first current level at the first current path is performed using the first balancing circuit configured to disconnect the first battery from the electric vehicle battery module output node when the first electric vehicle battery module is about to be removed from the electric vehicle battery system, and
   wherein balancing the second current level at the second current path is performed using the second balancing circuit configured to disconnect the second battery from the electric vehicle battery module output node when the second electric vehicle battery module is about to be removed from the electric vehicle battery system.

15. The method of claim 14, wherein the electric vehicle module output node is connected to a load.

16. The method of claim 14, wherein the electric vehicle battery module output node is connected to a charging source.

17. The method of claim 14, wherein:
balancing the first current level at the first current path is performed by using the first balancing circuit comprising a first module switch, the first balancing circuit configured to control pulse width modulation of the first module switch to control the first current level; and
balancing the second current level at the second current path is performed by using the second balancing circuit comprising a second module switch, the second balancing circuit configured to control pulse width modulation of the second module switch to control the second current level.

18. The method of claim 17, wherein the pulse width modulation of each of the first module switch and the second module switch is between 10 KHz to 500 KHz.

19. The method of claim 14, wherein
balancing the first current level at the first current path comprises reducing the first current level at the first current path; and
balancing the second current level at the second current path comprises reducing the second current level at the second current path.

20. The method of claim 14, wherein each of the first and second electric vehicle battery modules are configured to be removed and reconnected with the electric vehicle battery system without damage.

21. The method of claim 14, wherein each of the first battery and the second battery is configured to hold at least 200 volts.

22. The method of claim 14, wherein:
balancing the first current level at the first current path is performed using the first balancing circuit configured to disconnect the first battery from the electric vehicle battery module output node when the first current level sensed by the first current sensor is not between a first upper threshold and a first lower threshold; and
balancing the second current level at the second current path is performed using the second balancing circuit configured to disconnect the second battery from the electric vehicle battery module output node when the second current level sensed by the second current sensor is not between a second upper threshold and a second lower threshold.

23. The method of claim 14, wherein
balancing the first current level at the first current path is performed using the first balancing circuit configured to disconnect the first battery from the electric vehicle battery module output node when a first voltage level of the first electric vehicle battery module is not between a first upper threshold and a first lower threshold; and
balancing the second current level at the second current path is performed using the second balancing circuit configured to disconnect the second battery from the electric vehicle battery module output node when a second voltage level of the second electric vehicle battery module is not between a second upper threshold and a second lower threshold.

24. The method of claim 14, wherein
balancing the first current level at the first current path is performed using the first balancing circuit configured to disconnect the first battery from the electric vehicle battery module output node when a temperature of the first electric vehicle battery module is not between a first upper threshold and a first lower threshold; and
balancing the second current level at the second current path is performed using the second balancing circuit configured to disconnect the second battery from the electric vehicle battery module output node when a temperature of the second electric vehicle battery module is not between a second upper threshold and a second lower threshold.

25. The method of claim 14, wherein
balancing the first current level at the first current path is performed using the first balancing circuit configured to disconnect the first battery from the electric vehicle battery module output node when the electric vehicle is shut off; and
balancing the second current level at the second current path is performed using the second balancing circuit configured to disconnect the second battery from the electric vehicle battery module output node when the electric vehicle is shut off.

26. An electric vehicle battery system, comprising:
a plurality of electric vehicle battery modules connected in parallel, each electric vehicle battery module comprising:
a battery;
a balancing circuit in electrical communication with a current path from the battery to an electric vehicle battery module output node; and
a current sensor in electromagnetic communication with the current path between the battery and the balancing circuit, the current sensor configured to sense a current level between the battery and the balancing circuit,
wherein the balancing circuit is configured to balance the current level sensed by the current sensor of each electric vehicle battery module, and
wherein the balancing circuit is configured to disconnect the battery from the electric vehicle battery module output node when the electric vehicle is shut off.

* * * * *